(12) United States Patent
Matsubara et al.

(10) Patent No.: US 12,370,948 B2
(45) Date of Patent: Jul. 29, 2025

(54) BASE ASSEMBLY, AND PERIPHERY MONITORING DEVICE FOR VEHICLE

(71) Applicant: Misato Industries Co., Ltd., Fujioka (JP)

(72) Inventors: Tomoya Matsubara, Isehara (JP); Ryosuke Iba, Isehara (JP)

(73) Assignee: Misato Industries Co., Ltd., Fujioka (JP)

( * ) Notice: Subject to any disclaimer, the term of this patent is extended or adjusted under 35 U.S.C. 154(b) by 416 days.

(21) Appl. No.: 18/040,097

(22) PCT Filed: Jul. 26, 2021

(86) PCT No.: PCT/JP2021/027490
§ 371 (c)(1),
(2) Date: Jan. 31, 2023

(87) PCT Pub. No.: WO2022/024973
PCT Pub. Date: Feb. 3, 2022

(65) Prior Publication Data
US 2023/0264629 A1 Aug. 24, 2023

(30) Foreign Application Priority Data
Jul. 31, 2020 (JP) .................. 2020-130199

(51) Int. Cl.
*B60R 1/06* (2006.01)
*B60R 1/074* (2006.01)
(52) U.S. Cl.
CPC ............. *B60R 1/06* (2013.01); *B60R 1/074* (2013.01)

(58) Field of Classification Search
CPC .................. B60R 1/06; B60R 1/074
(Continued)

(56) References Cited

U.S. PATENT DOCUMENTS 7,758,010 B2 * 7/2010 Tanaka ............... B60R 1/06
248/475.1
8,342,702 B2 * 1/2013 Ohe ................... B60R 1/06
359/872

(Continued)

FOREIGN PATENT DOCUMENTS

DE 23 37 475 A1 2/1975
JP 2018-111344 A 7/2018

OTHER PUBLICATIONS

International Search Report mailed on Aug. 24, 2021 in PCT/JP2021/027490 filed on Jul. 26, 2021.
(Continued)

*Primary Examiner* — Ricky D Shafer
(74) *Attorney, Agent, or Firm* — Oblon, McClelland, Maier & Neustadt, L.L.P.

(57) ABSTRACT

A base assembly and a periphery monitoring device for a vehicle include a base, a gasket, and a cover. The base includes a fixed part and a mounting part. The gasket is mounted to the fixed part between the fixed part and a door. The cover is mounted to and covers lower portions of the fixed part and the mounting part. A rib that has a lower rib is provided on the edge of the fixed part. The fixed part is provided with upper and lower drainage ports arranged vertically to each other. The gasket is provided with a final drainage port. As a result, the door is sealed.

6 Claims, 6 Drawing Sheets

(58) Field of Classification Search
USPC .................................... 359/841, 871, 872
See application file for complete search history.

(56) References Cited

U.S. PATENT DOCUMENTS

| | | | | |
|---|---|---|---|---|
| 8,919,973 | B2* | 12/2014 | Schmierer | B60R 1/06 |
| | | | | 248/479 |
| 9,340,158 | B2* | 5/2016 | Nishimura | B60R 1/06 |
| 10,589,683 | B2* | 3/2020 | Bortolon | B60R 1/072 |
| 11,135,976 | B2* | 10/2021 | Rothschild | B60R 1/074 |
| 11,505,125 | B2* | 11/2022 | Caraan | B60R 1/06 |
| 12,179,667 | B2* | 12/2024 | Kawanishi | B60J 5/0404 |
| 2011/0194201 | A1* | 8/2011 | Muramatsu | B60J 5/0404 |
| | | | | 359/871 |
| 2012/0235009 | A1* | 9/2012 | Horie | B60R 1/06 |
| | | | | 248/475.1 |
| 2015/0028615 | A1* | 1/2015 | Takata | B60R 1/06 |
| | | | | 296/1.11 |
| 2019/0176706 | A1* | 6/2019 | Hamada | B60R 1/06 |
| 2019/0193636 | A1* | 6/2019 | Sawada | B60R 1/074 |

OTHER PUBLICATIONS

Extended European Search Report issued Jun. 11, 2024, in corresponding European Patent Application No. 21850259.9, 5 pages.

* cited by examiner

BASE ASSEMBLY, AND PERIPHERY MONITORING DEVICE FOR VEHICLE

TECHNICAL FIELD

The present invention relates to a base assembly constituting a periphery monitoring device for a vehicle. The present invention also relates to a periphery monitoring device for a vehicle including a base assembly.

BACKGROUND ART

Conventionally, there has been a base assembly configuring a periphery monitoring device for a vehicle, or a periphery monitoring device for a vehicle including a base assembly (refer to PTL 1, for example). An outside mirror device for a vehicle disclosed in PTL 1 is described in the following.

The door mirror of PTL 1 includes a door mirror body, a mounting stay, and stay packing. Convex strips are formed on the periphery of the mounting stay. A stay attachment portion is formed on the periphery of a side of the stay packing. The stay attachment portion is externally fitted to the periphery of the mounting stay. A lip portion consisting of two bent portions is formed on the periphery of the other side of the stay packing. The lip portion deforms elastically and adheres to the vehicle body. This ensures sealing the gap between the stay packing and the vehicle body.

CITATION LIST

Patent Literature

[PTL 1] Japanese Unexamined Patent Publication No. 2018-111344

SUMMARY OF THE INVENTION

Problems to be Solved by the Invention

In a base assembly and a periphery monitoring device for a vehicle, it is important to ensure sealing the gap between the base assembly and the vehicle body, as described in PTL 1.

The problem to be solved by the present invention is to provide a base assembly and a periphery monitoring device for a vehicle, which is capable of establishing a seal between the vehicle body and the base assembly.

Means for Solving the Problem

A base assembly according to the present invention includes: a base; a gasket; and a cover, wherein the base has a fixed part fixed to a vehicle body and a mounting part, a monitoring assembly being mounted to an upper portion of the mounting part, the gasket is mounted to the fixed part and disposed between the fixed part and the vehicle body, the cover is mounted to a lower portion of the fixed part and a lower portion of the mounting part and covers the lower portion of the fixed part and the lower portion of the mounting part, a rib is provided on the fixed part, the rib sealing a gap between the gasket and the vehicle body by abutting the gasket to cause the gasket to come into contact with the vehicle body, lower edge portions facing each other are provided on a lower portion of the fixed part, a lower portion of the gasket, and a lower portion of the cover, the rib has at least a lower rib corresponding to the lower edge portion of the fixed part, a portion of the fixed part above the lower rib is provided with, an upper drainage port allowing water in a first space enclosed by the base, the gasket, and the cover to flow down into a second space enclosed by the fixed part and the gasket, and a lower drainage port allowing water in the second space to flow down into a third space enclosed by the base, the gasket, and the cover and positioned below the first space, the upper drainage port and the lower drainage port being arranged vertically to each other, and a final drainage port is provided in a portion of the gasket below the lower rib and allows water in the third space to flow down to outside of the vehicle body.

In the base assembly of the present invention, it is preferred that a portion of the gasket enclosing the second space tilts from the upper drainage port to the lower drainage port.

In the base assembly of the present invention, it is preferred that a width between the base and the cover enclosing the third space is greater than a width between the base and the gasket facing each other via a lower rib.

In the base assembly of the present invention, it is preferred that a lip portion abutting the vehicle body be provided on a tip of a lower edge portion of the gasket, and the lip portion is provided with a final drainage port.

In the base assembly of the present invention, it is preferred that a portion of the gasket in contact with the vehicle body by the ribs is provided with a buffer member.

A periphery monitoring device for a vehicle according to the present invention includes the base assembly according to the present invention fixed to the vehicle body and a monitoring assembly mounted to the base assembly.

Effect of the Invention

The base assembly and the periphery monitoring device for a vehicle of the present invention can establish a seal between the vehicle body and the base assembly.

MODE FOR CARRYING OUT THE INVENTION

Now, a base assembly and a periphery monitoring device for a vehicle according to an embodiment (example) of the present invention is described below in detail with reference to the drawings. It should be noted that as the drawings are schematically illustrated, main components are illustrated, components other than the main components are omitted, and hatching or cross section would be partially omitted from the drawings.

In this specification, front, back, up, down, left, and right directions respectively correspond to front, back, up, down, left, and right directions when a vehicle is equipped with the periphery monitoring device for a vehicle according to the present invention. In FIGS. 1 to 3 and FIG. 5, the reference symbols "F", "B", "U", "D", "L", and "R" express "front", "back", "up", "down", "left", and "right", respectively.

Description of Configuration of Embodiments

Figure 1:
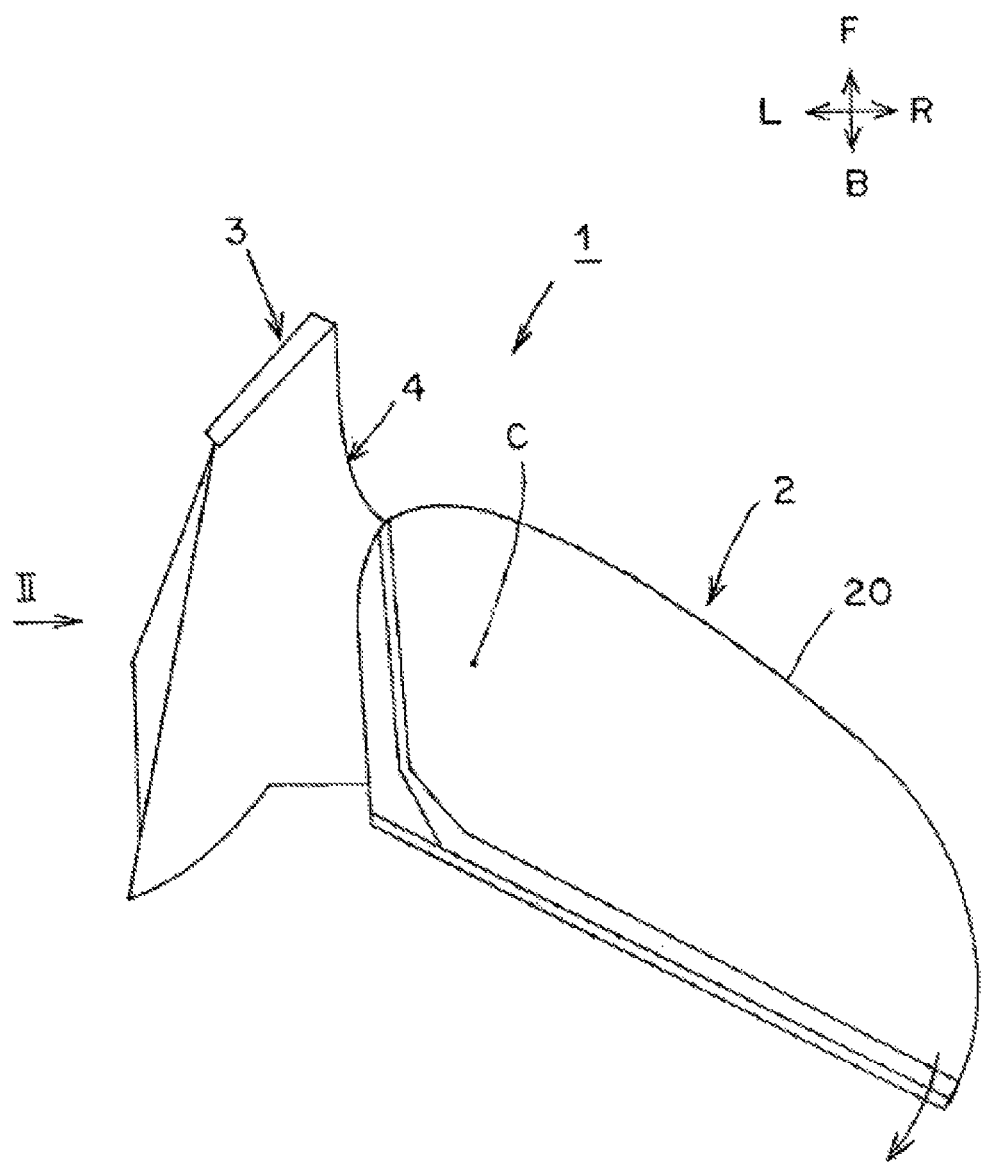
FIG. 1 is a plan view of an outside mirror device for a vehicle illustrating an embodiment of a base assembly and a periphery monitoring device for a vehicle of the present invention.
Figure 2:
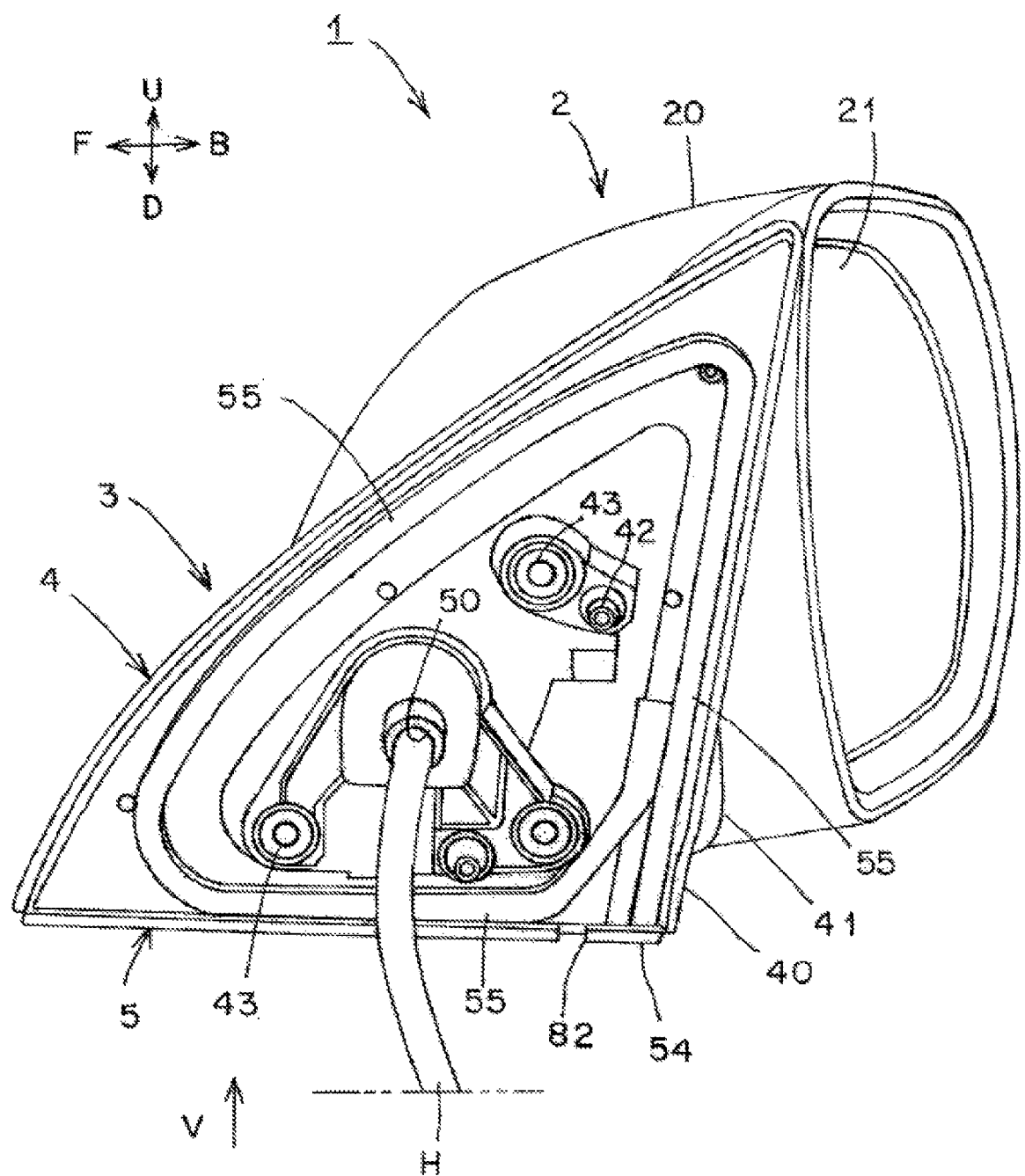
FIG. 2 is a side view of the vehicle body mounting side (a view along a direction of an arrow II in FIG. 1) illustrating the outside mirror device for a vehicle.
Figure 3:
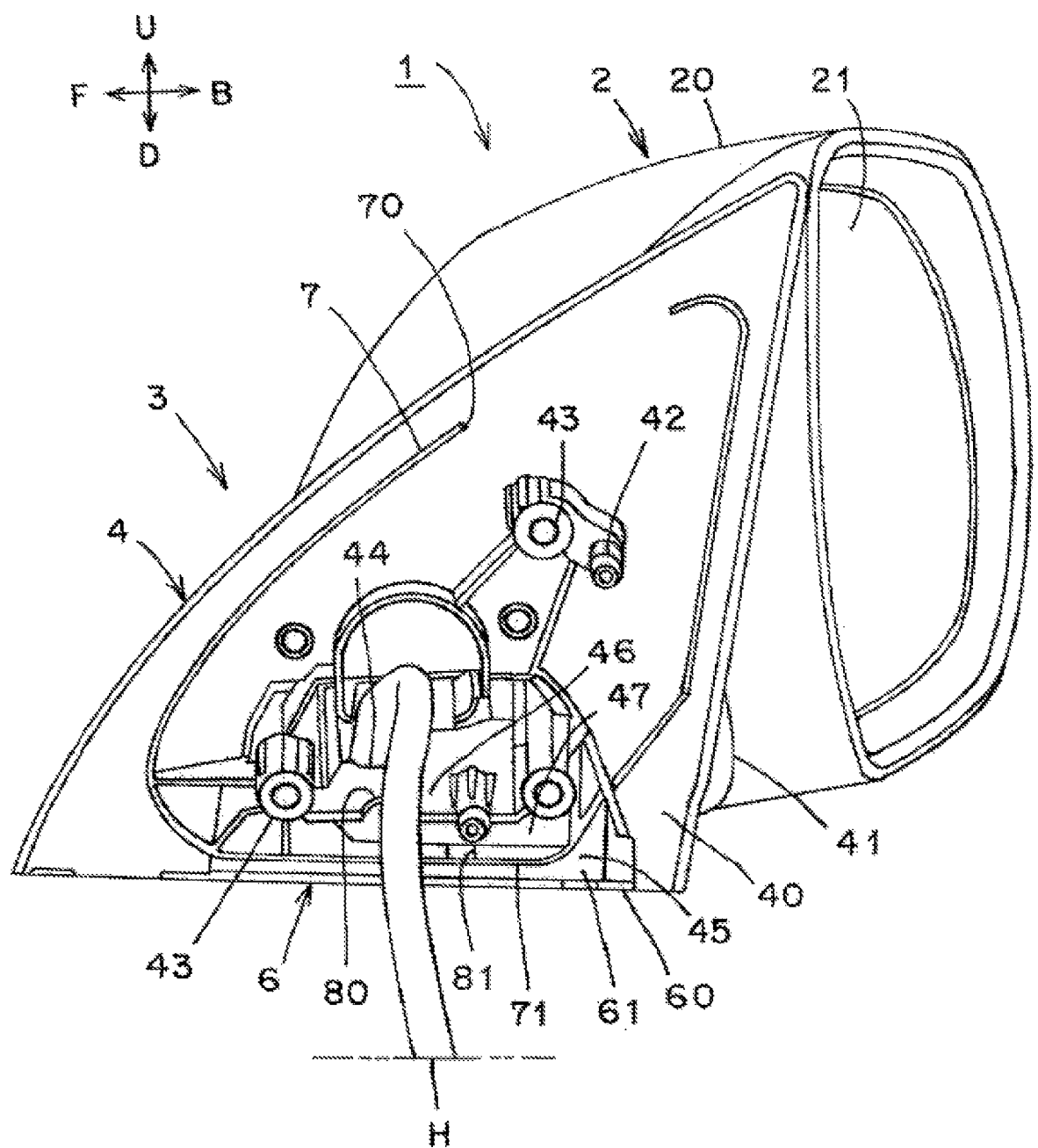
FIG. 3 is a side view of the vehicle body mounting side (side view corresponding to FIG. 2) illustrating the outside mirror device for a vehicle with the gasket removed.

The configuration of the base assembly and the periphery monitoring device for a vehicle according to the present embodiment is described below. In FIGS. 1 to 3, reference numeral 1 denotes the periphery monitoring device for a vehicle according to the embodiment.

Description of Periphery Monitoring Device 1 for Vehicle

In this example, the periphery monitoring device 1 for a vehicle is, for example, an outside mirror device for a vehicle or a door mirror for a vehicle (hereinafter simply referred to as "door mirror 1"). The door mirrors 1 are provided on left and right doors 10 for a vehicle (see the chain double-dashed lines in FIG. 6).

The door mirror 1 provided on the right door 10 will be described below. Here, in the door mirror 1 provided on the right door 10, the right side is defined as the outside of the vehicle, while the right side is defined as the inside of the vehicle. The door mirrors 1 provided on the left and right doors 10 are substantially symmetrical in shape. Accordingly, description of the door mirror provided on the left door is omitted.

The door mirror 1 includes a monitoring assembly 2 and base assembly 3, as illustrated in FIGS. 1 to 3. The base assembly 3 is fixed to panels (door panel, vehicle body panel, outer panel of vehicle body) of the door 10. The monitoring assembly 2 is mounting to the base assembly 3 in a rotatable manner about a rotation center line C.

Description of Monitoring Assembly 2

As illustrated in FIGS. 1 to 3, the monitoring assembly 2 includes a housing 20, a monitoring unit 21, an electric retracting unit (not illustrated), and a harness H. The monitoring assembly 2 may have a side turn signal lamp as a vehicle light on the housing 20.

The housing 20 has a hollow box shape and is open to the front side (back side of the vehicle).

In this example, the monitoring unit 21 is a mirror and is positioned in the opening portion of the housing 20. The monitoring unit 21 is mounted to the housing 20 via a drive mechanism (power unit). A mirror surface of the monitoring unit 21 is adjustable by the drive mechanism in a left-right direction around a vertical axis and an up-down direction around a horizontal axis. The mirror may be equipped with a defogging heater and an EC layer for automatic antiglare.

The monitoring unit 21 may be a camera in place of the mirror in this example. In the case where the monitoring unit is a camera, dimension of the housing 20 can be significantly reduced in the up-down direction. Information about the periphery of the vehicle captured by the camera can be displayed on a display device (not illustrated) in the interior of the vehicle via an image processing device or the like (not illustrated).

The electric retracting unit causes the monitoring assembly 2 to rotate between a use position (the state illustrated in FIGS. 1 to 3) and a rear retracted position (not illustrated) with electric power (see the solid arrow in FIG. 1 in the clockwise direction around the rotation center line C).

The electric retracting unit includes a casing, a shaft, a motor, a switching mechanism, a speed reduction mechanism, and a clutch mechanism. The shaft, the motor, the switching mechanism, the speed reduction mechanism, and the clutch mechanism are accommodated in the casing. The casing is accommodated in the housing 20 and mounted to the housing 20.

The shaft is mounted to the base assembly 3. In this way, the monitoring assembly 2 is rotatably mounted to the base assembly 3. A longitudinal center axis line of the shaft aligns with the rotation center line C of the monitoring assembly 2.

The harness H is connected to electrical devices and electronic components of the electric retracting unit and the drive unit. The harness H is led out from the housing 20 of the monitoring assembly 2 through the base assembly 3 and connected to the electronic controls and power supply (battery) in the vehicle.

Description of Base Assembly 3

Figure 5:
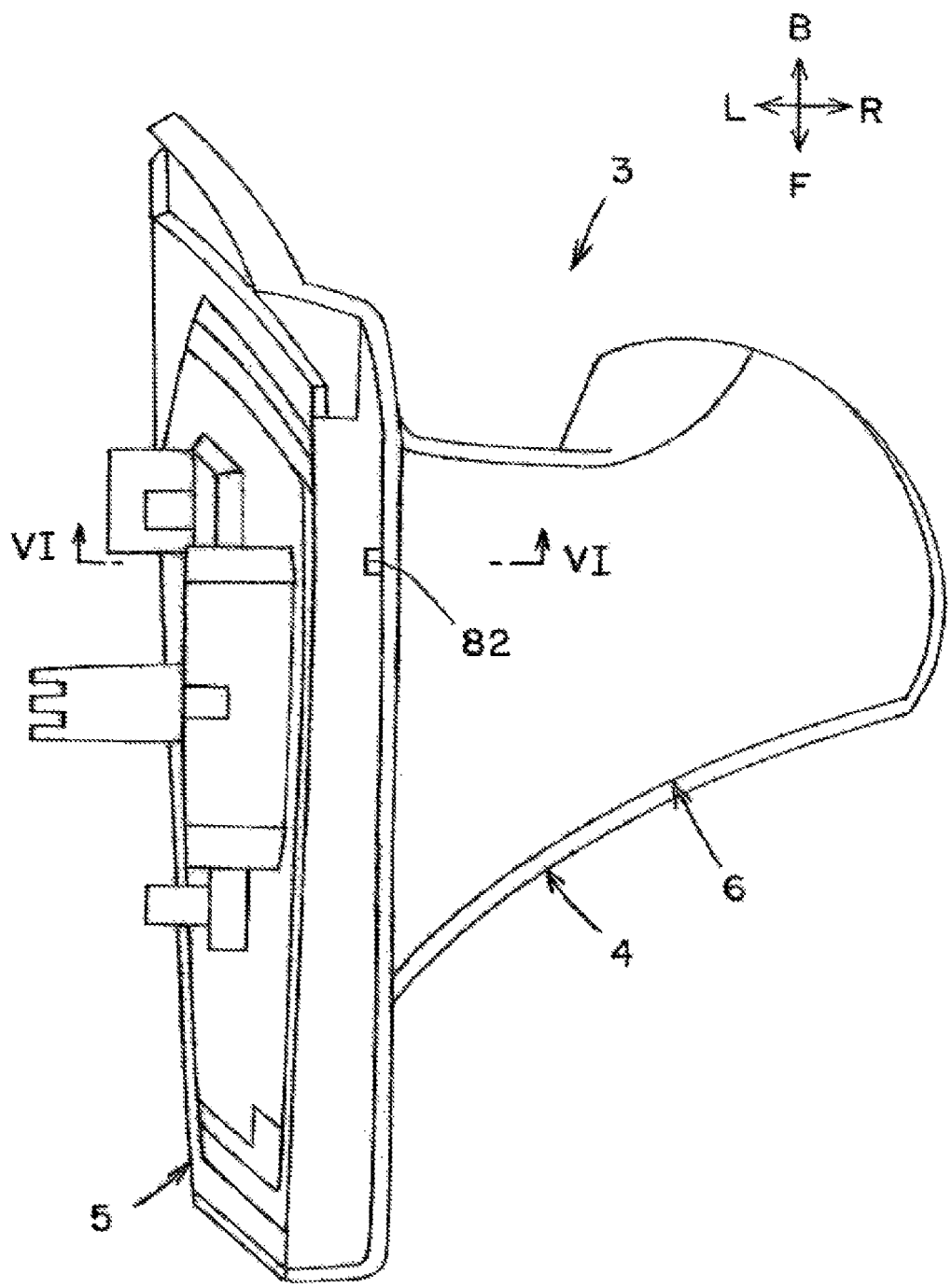
FIG. 5 is a bottom view of the base assembly (viewed along a direction of an arrow V in FIG. 2) with the monitoring assembly removed.

As illustrated in FIGS. 2 and 5, the base assembly 3 includes a base 4, a gasket 5, and a cover (base undercover) 6. The base assembly 3 is fixed to the door 10 with a fixing means (not illustrated). Screws or the like are used as the fixing means as appropriate.

Description of Base 4

In this example, the base 4 is formed by die cast molding of a highly rigid resin or the like. As illustrated in FIGS. 2 and 3, the base 4 has a fixed part 40 and a mounting part 41.

The fixed part 40 and the mounting part 41 are integrated into a single unit. That is, the lower portion of the fixed part 40 is integrally connected to a left end portion of the mounting part 41.

The fixed part 40 is provided along a substantially vertical direction. The fixed part 40 has a substantially right-angled triangular shape when viewed from the door 10 side. The fixed part 40 is fixed to the door 10. The surface of the fixed part 40 facing the door 10 is provided with an integrated unit of a positioning protruding portion 42 and a mounting boss portion 43, which is positioned and secured on the door 10. The fixed part 40 is provided with a through-hole 44 through which the harness H in the housing 20 of the monitoring assembly 2 is drawn out of the housing 20.

Figure 6:
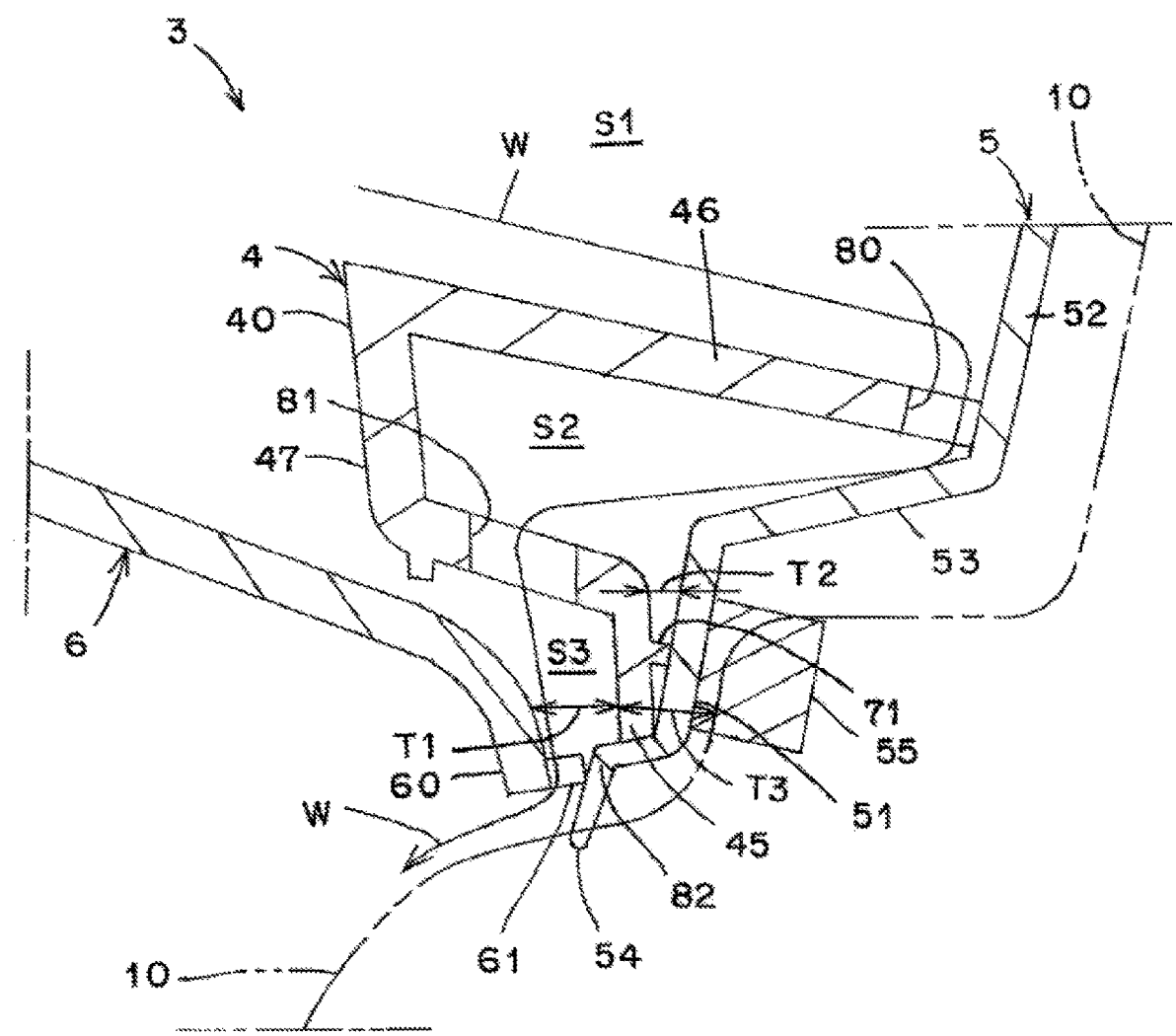
FIG. 6 is a partially enlarged cross-sectional view (a partially enlarged cross-sectional view taken along a line VI-VI in FIG. 5) of the drainage path.

As illustrated in FIG. 6, the lower portion of the fixed part 40 is integrally provided with a lower edge portion 45 in a substantially vertical direction. Above the lower edge portion 45 of the fixed part 40, a holding portion 46 that holds the gasket 5 is integrally provided. The holding portion 46 is provided substantially horizontally, and tilts downward from the cover 6 side to the gasket 5 side.

Between the lower edge portion 45 of the fixed part 40 and the holding portion 46, a connecting portion 47 is integrally provided. The connecting portion 47 has a substantially L-shaped cross section and connects the lower edge portion 45 to the holding portion 46.

The mounting part 41 is provided along a substantially horizontal direction. The shaft of the electric retracting unit of the monitoring assembly 2 is mounted to the upper portion of the mounting part 41.

Description of Gasket 5

In this example, the gasket 5 is made of PE (polyethylene), EPDM (ethylene propylene rubber), POM (polyacetal, acetal resin), TEO (thermoplastic elastomer), o the like. Namely, the gasket 5 is made of resin-based or rubber-based flexible elastic material.

As illustrated in FIGS. 2, 5, and 6, the gasket 5 is mounted to the fixed part 40 of the base 4 with a mounting means (not illustrated) between the fixed part 40 and the door 10. A means such as a mating means or an elastic mating means can be employed as the assembly means as appropriate.

As illustrated in FIG. 2, the gasket 5 has a substantially right-angled triangular shape that is slightly larger than the fixed part 40 when viewed from the door 10 side like the fixed part 40 of the base 4. The gasket 5 covers the entire fixed part 40 of the base 4.

The gasket 5 is provided with a through-hole 50. The harness H, which is drawn from the through-hole 44 in the base 4, is drawn from the through-hole 50 in the gasket 5 to the outside of the base assembly 3.

As illustrated in FIG. 6, a lower edge portion 51 is integrally provided on the lower portion of the gasket 5 in a substantially vertical direction. The lower edge portion 51 of the gasket 5 and the lower edge portion 45 of the fixed part 40 face each other.

A body portion 52 held by the holding portion 46 of the fixed part 40 is provided above the lower edge portion 51 of the gasket 5 in a substantially vertical direction. A connecting portion 53 is integrally provided between the lower edge portion 51 and the body portion 52. The connecting portion 53 tilts downward from the body portion 52 to the lower edge portion 51 and connects the lower edge portion 51 and the body portion 52.

Below the lower edge portion 51 of the gasket 5, i.e., at the tip of the lower edge portion 51 of the gasket 5, a lip portion 54 that contacts the door 10 is integrally provided. The lip portion 54 has an L-shaped cross section.

A portion of the gasket 5 in contact with the door 10 via a rib 7 is provided with a buffer member 55. The buffer member 55 is in the form of a tape and is bonded to the gasket 5. The buffer member 55 combines a cushioning function of a cushioning material with a waterproofing function of a waterproofing material, and is made of synthetic rubber foam.

Description of Cover 6

In this example, the cover 6 is made of molded resin. As illustrated in FIGS. 3 through 6, the cover 6 is mounted to a lower portion of the fixed part 40 and a lower portion of the mounting part 41 of the base 4 with a mounting means (not illustrated) to cover the lower portion of the fixed part 40 and the lower portion of the mounting part 41. A means such as a mating means or an elastic mating means can be employed as the assembly means as appropriate.

As illustrated in FIG. 6, the lower portion of the cover 6 is integrally provided with a lower edge portion 60 in a substantially vertical direction. The lower edge portion 60 of the cover 6, the lower edge portion 51 of the gasket 5, and the lower edge portion 45 of the fixed part 40 face each other. A portion of the lower edge portion 60 of the cover 6 is integrally provided with an abutting protruding portion 61 that protrudes toward the lip portion 54 and abuts the lip portion 54 of the gasket 5.

Description of Rib 7

Figure 4:
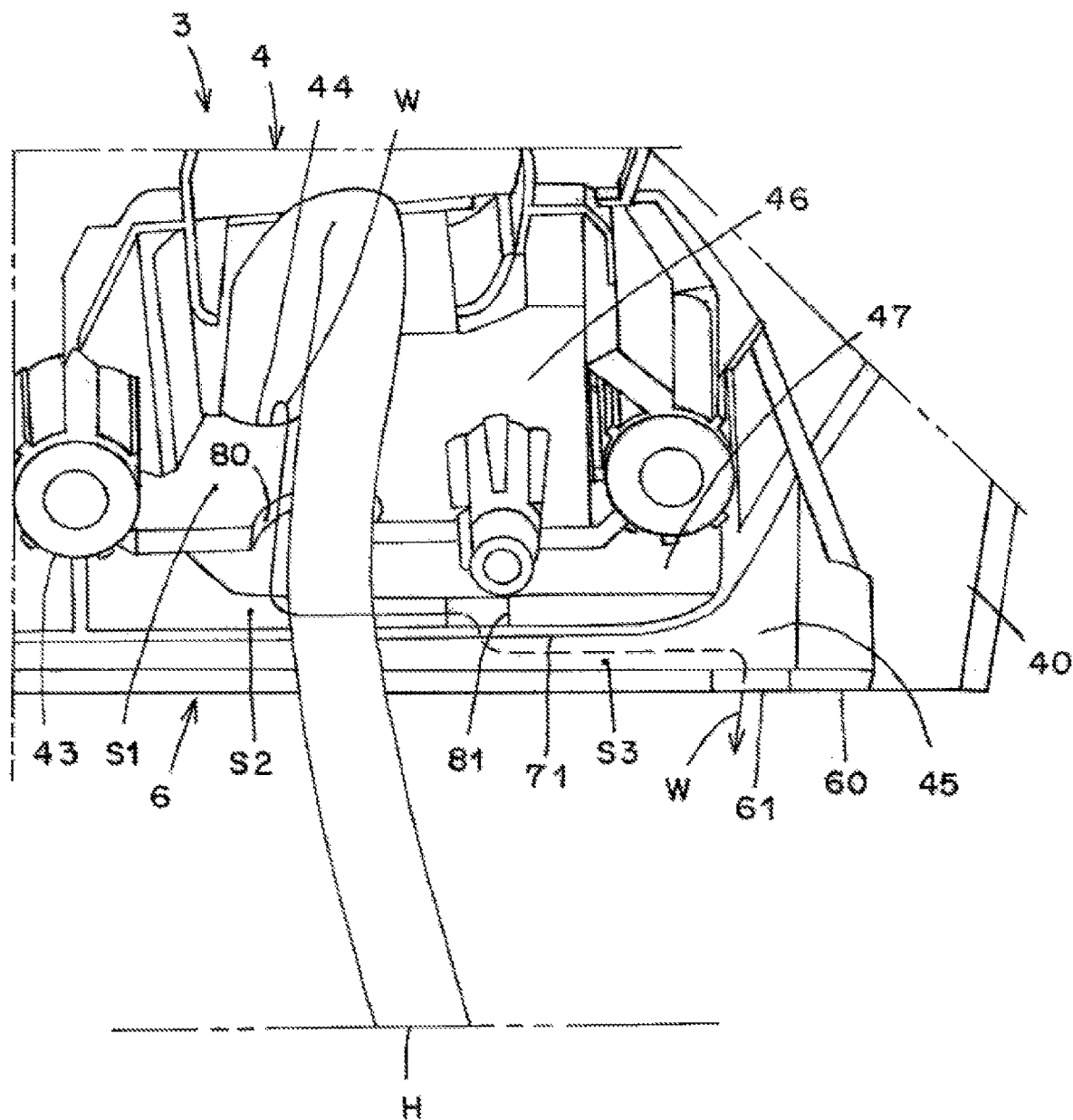
FIG. 4 is a partially enlarged side view (a partially enlarged side view corresponding to FIG. 3) illustrating a drainage path.

As illustrated in FIGS. 3, 4, and 6, the rib 7 protruding toward the gasket 5 is integrally provided at the peripheral portion of a surface of the fixed part 40 of the base 4 facing the door 10. In this example, the rib 7 has the upper portion 70 cut out, as illustrated in FIG. 3. The rib 7 may be provided integrally on the entire peripheral portion of the fixed part 40 without the cutout portion 70.

The rib 7 abuts the edge of gasket 5 to cause the edge of gasket 5 to come into contact with the door 10 to seal the gap between the gasket 5 and the door 10. The rib 7 has a lower rib 71 corresponding to the lower edge portion 45 of the fixed part 40 of the base 4. The rib 7 may have at least the lower rib 71.

Description of Spaces S1, S2, and S3

The interior of the base assembly 3, i.e., the interior enclosed by the base 4, the gasket 5, and the cover 6, forms a first space S1. The interior enclosed by the holding portion 46 and connecting portion 47 of the fixed part 40 of the base 4 and the connecting portion 53 of the gasket 5 forms a second space S2. Furthermore, the interior enclosed by the base 4, the gasket 5, and the cover 6 and positioned below the first space S1 forms a third space S3.

The holding portion 46 of the fixed part 40 that encloses the first space S1 tilts downward toward an upper drainage port 80. The connecting portion 53 of the gasket 5 enclosing the second space S2 tilts downward from the upper drainage port 80 to a lower drainage port 81. The lower edge portion 45 of the base 4, the lower edge portion 51 of the gasket 5, and the lower edge portion 60 of the cover 6, which enclose the third space S3, hang downward from the lower drainage port 81 to a final drainage port 82.

Description of Drainage Ports 80, 81, and 82

As illustrated in FIGS. 2 through 6, the upper drainage port 80 and lower drainage port 81 are arranged vertically to each other above the lower rib 71 in the fixed part 40 of the base 4. The final drainage port 82 is provided in the gasket 5 below the lower rib 71.

The upper drainage port 80 is provided at the tip of the holding portion 46 of the fixed part 40 that is in contact with the gasket 5 (the downward slope tip). The upper drainage port 80 allows the water W in the first space S1 to flow down into the second space S2 along the slope of the holding portion 46 of the fixed part 40.

The lower drainage port 81 is positioned in the horizontal portion of the connecting portion 47 of the fixed part 40 facing the holding portion 46. The lower drainage port 81 allows the water W in the second space S2 to flow down into the third space S3 along the slope of the connecting portion 53 of the gasket 5.

The final drainage port 82 is positioned at the vertical portion of the lip portion 54 of the gasket 5. The final drainage port 82 allows the water W in the third space S3 to flow down to the outside of the door 10 along the vertical direction of the lower edge portion 45 of the base 4, the lower edge portion 51 of the gasket 5 and the lower edge portion 60 of the cover 6.

In this way, the first space S1, the upper drainage port 80, the second space S2, the lower drainage port 81, the third space S3, and the final drainage port 82 constitute a path (drainage channel) through which the water W in the housing 20 of the monitoring assembly 2 is drained out of the door 10.

The width T1 between the lower edge portion 45 of the base 4 and the lower edge portion 60 of the cover 6 enclosing the third space S3 is greater than the width T2 between the lower edge portion 45 of the base 4 and the lower edge portion 51 of the gasket 5 facing each other via the lower rib 71 (i.e., the protruding dimension of the lower rib 71). T3 is the width of a sealing structure consisting of the lower edge portion 45 of the base 4, the lower edge portion 51 of the gasket 5, the lower rib 71, and the buffer member 55 when the sealing structure is sealing to the door 10.

Explanation of Operation of Embodiment

The base assembly 3 and the periphery monitoring device 1 for a vehicle according to the present embodiment are configured as mentioned above, and the drainage operation thereof is described below.

First, water W, such as car wash water or rainwater, enters the housing 20 through the gap between the housing 20 and the monitoring unit 21 of the monitoring assembly 2. The water W in the housing 20 travels through the harness H and enters the base assembly 3, i.e., the first space S1 enclosed by the base 4, the gasket 5, and the cover 6.

The water W, such as car wash water or rainwater, enters the base assembly 3, i.e., the first space S1 enclosed by the base 4, the gasket 5, and the cover 6, through the gap between the housing 20 of the monitoring assembly 2 and the base 4 of the base assembly 3.

The water W entering the first space S1 is drained out of the door 10 through the first space S1, the upper drainage port 80, the second space S2, the lower drainage port 81, the third space S3, and the final drainage port 82.

Effects of Embodiment

The base assembly 3 and the periphery monitoring device 1 for a vehicle according to the present embodiment are configured and operates as mentioned above, and the effect thereof is described below.

The base assembly 3 and the periphery monitoring device 1 for a vehicle according to the present embodiment are provided with the upper drainage port 80 and the lower drainage port 81 arranged vertically to each other on the fixed part 40 of the base 4 above the lower rib 71, and the final drainage port 82 on the gasket 5 below the lower rib 71. This allows the base assembly 3 and the periphery monitoring device 1 for a vehicle according to the present embodiment to drain the water W that has entered the base assembly 3, i.e., the first space S1 enclosed by the base 4, the gasket 5, and the cover 6, through the upper drainage port 80, the lower drainage port 81, and the final drainage port 82 to the outside of the door 10 without providing a cutout in the lower rib 71. As a result, the base assembly 3 and the periphery monitoring device 1 for a vehicle according to the present embodiment does not require a cutout in the lower rib 71, thus ensuring sealing of the gap between them and the vehicle body.

Since the base assembly 3 and the periphery monitoring device 1 for a vehicle according to the present embodiment has the holding portion 46 of the fixed part 40 of the base 4, which encloses the first space S1, tilting downward toward the upper drainage port 80, the water W in the first space S1 can flow down smoothly along the slope of the holding portion 46, toward the upper drainage port 80. As a result, the base assembly 3 and the periphery monitoring device 1 for a vehicle according to the present embodiment have good drainage efficiency.

Since the base assembly 3 and the periphery monitoring device 1 for a vehicle according to the present embodiment has the connecting portion 53 of the gasket 5, which encloses the second space S2, tilting downward from the upper drainage port 80 to the lower drainage port 81, the water W in the second space S2 can flow down smoothly along the slope of the connecting portion 53, toward the lower drainage port 81. As a result, the base assembly 3 and the periphery monitoring device 1 for a vehicle according to the present embodiment have good drainage efficiency.

Since the base assembly 3 and the periphery monitoring device 1 for a vehicle according to the present embodiment consist of the lower edge portion 45 of the base 4, the lower edge portion 51 of the gasket 5, and the lower edge portion 60 of the cover 6, which enclose the third space S3, hanging downward from the lower drainage port 81 to the final drainage port 82, the water W in the third space S3 can flow down smoothly along the lower edge portion 45 of the base 4, the lower edge portion 51 of the gasket 5, and the lower edge portion 60 of the cover 6 in the vertical direction, toward the final drainage port 82. As a result, the base assembly 3 and the periphery monitoring device 1 for a vehicle according to the present embodiment have good drainage efficiency.

Since in the base assembly 3 and the periphery monitoring device 1 for a vehicle according to the present embodiment, the width T1 between the lower edge portion 45 of the base 4 and the lower edge portion 60 of the cover 6, which enclose the third space S3, is larger than the width T2 between the lower edge portion 45 of the base 4 and the lower edge portion 51 of the gasket 5 facing each other via the lower rib 71, the width T3 of the sealing structure in the sealed state can be reduced, and the width T1 of the third space S3 of the drainage channel can be wide. As a result, the base assembly 3 and the periphery monitoring device 1 for a vehicle according to the present embodiment can reduce the width T3 to the sealing surface of the sealing structure (outer surface of the door 10) and maintain drainage efficiency.

Since in the base assembly 3 and the periphery monitoring device 1 for a vehicle according to the present embodiment, the lip portion 54 abutting the door 10 is provided at the tip of the lower edge portion 51 of the gasket 5, the lip portion 54 can ensure sealing of the gap between the lower edge portion 51 of the gasket 5 and the door 10.

Moreover, since in the base assembly 3 and the periphery monitoring device 1 for a vehicle according to the present embodiment, the final drainage port 82 is provided on the lip portion 54, sealing and drainage efficiency can be maintained.

Description of Examples Other than Embodiments

In the base assembly 3 and the periphery monitoring device 1 for a vehicle according to the above embodiment, the monitoring assembly 2 is mounted to the base assembly 3 in a manner electrically and manually rotatable around the rotation center line C via the electric retracting unit. However, according to the present invention, the monitoring assembly 2 may be mounted to the base assembly 3 in a manner manually rotatable around the rotation center line C without the electric retracting unit. The monitoring assembly 2 may be fixed to the base assembly 3 so as not to rotate around the rotation center line C.

DESCRIPTION OF REFERENCE NUMERALS

1 door mirror (periphery monitoring device for a vehicle)
10 door
2 monitoring assembly
20 housing
21 monitoring unit
3 base assembly
4 base
40 fixed part
41 mounting part
42 positioning protruding portion
43 mounting boss portion
44 through-hole
45 lower edge portion
46 holding portion
47 connecting portion
5 gasket
50 through-hole
51 lower edge portion
52 body portion
53 connecting portion
54 lip portion
55 buffer member
6 cover (base undercover)
60 lower edge portion
61 abutting portion
7 rib
70 cutout portion
71 lower rib
80 upper drainage port
81 lower drainage port
82 final drainage port
B rear
C rotation center line
D down
F front
H harness
L left
R right
S1 first space
S2 second space
S3 third space
T1, T2, T3 width
U up
W water

The invention claimed is:
1. A base assembly comprising:
a base;
a gasket; and
a cover, wherein
the base has a fixed part fixed to a vehicle body and a mounting part, a monitoring assembly being mounted to an upper portion of the mounting part,
the gasket is mounted to the fixed part and disposed between the fixed part and the vehicle body,
the cover is mounted to a lower portion of the fixed part and a lower portion of the mounting part and covers the lower portion of the fixed part and the lower portion of the mounting part,
a rib is provided on the fixed part, the rib sealing a gap between the gasket and the vehicle body by abutting the gasket to cause the gasket to come into contact with the vehicle body,
lower edge portions facing each other are provided on the lower portion of the fixed part, a lower portion of the gasket, and a lower portion of the cover,
the rib has at least a lower rib corresponding to the lower edge portion of the fixed part,
a portion of the fixed part above the lower rib is provided with,
an upper drainage port allowing water in a first space enclosed by the base, the gasket, and the cover to flow down into a second space (S2) enclosed by the fixed part and the gasket, and
a lower drainage port allowing water in the second space to flow down into a third space enclosed by the base, the gasket, and the cover and positioned below the first space, the upper drainage port and the lower drainage port being arranged vertically to each other, and
a final drainage port is provided in a portion of the gasket below the lower rib and allows water in the third space to flow down to outside of the vehicle body.

2. The base assembly according to claim 1, wherein a portion of the gasket enclosing the second space tilts from the upper drainage port to the lower drainage port.

3. The base assembly according to claim 1, wherein a width between the base and the cover enclosing the third space is greater than a width between the base and the gasket facing each other via the lower rib.

4. The base assembly according to claim 1, wherein
a lip portion abutting the vehicle body is provided on a tip of the lower edge portion of the gasket, and
the lip portion is provided with the final drainage port.

5. The base assembly according claim 1, wherein a portion of the gasket in contact with the vehicle body by the rib is provided with a buffer member.

6. A periphery monitoring device for a vehicle, comprising:
the base assembly according to claim 1, the base assembly being fixed to the vehicle body; and
a monitoring assembly mounted on the base assembly.

* * * * *